April 15, 1924. 1,490,168
J. H. FORD ET AL
WINDSHIELD HEATER
Filed Jan. 10, 1923 3 Sheets-Sheet 2
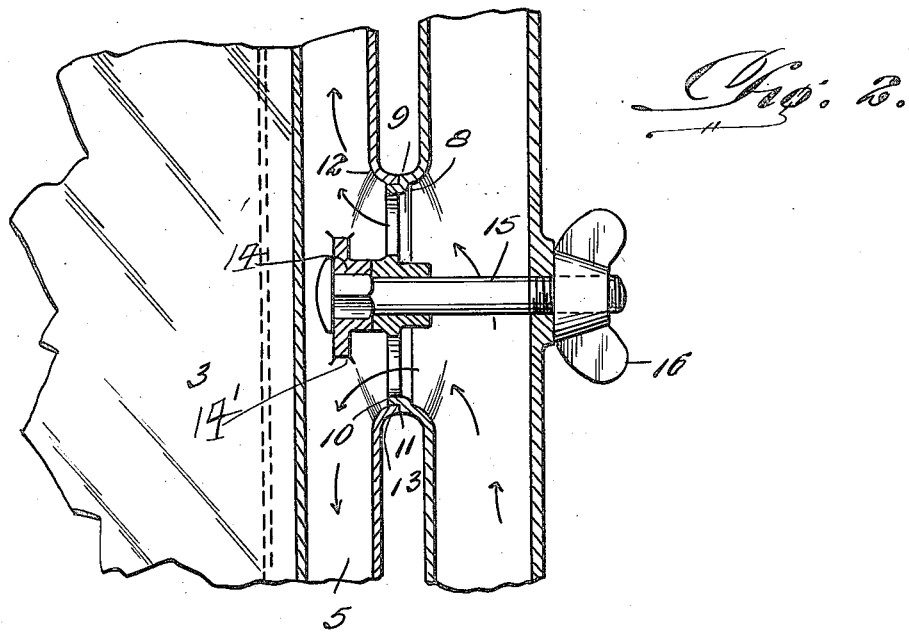
*Fig. 2.*
*Fig. 3.*
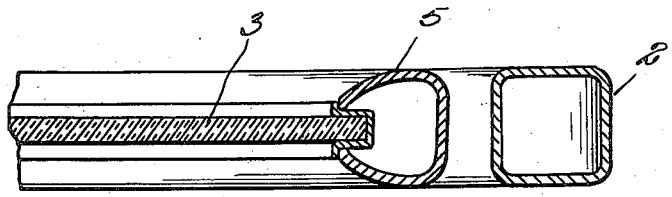
Witnesses:
F. L. Fox
H. V. Berman
James H. Ford,
William A. Keller,
INVENTOR.
BY Clarence A. O'Brien
ATTORNEY.

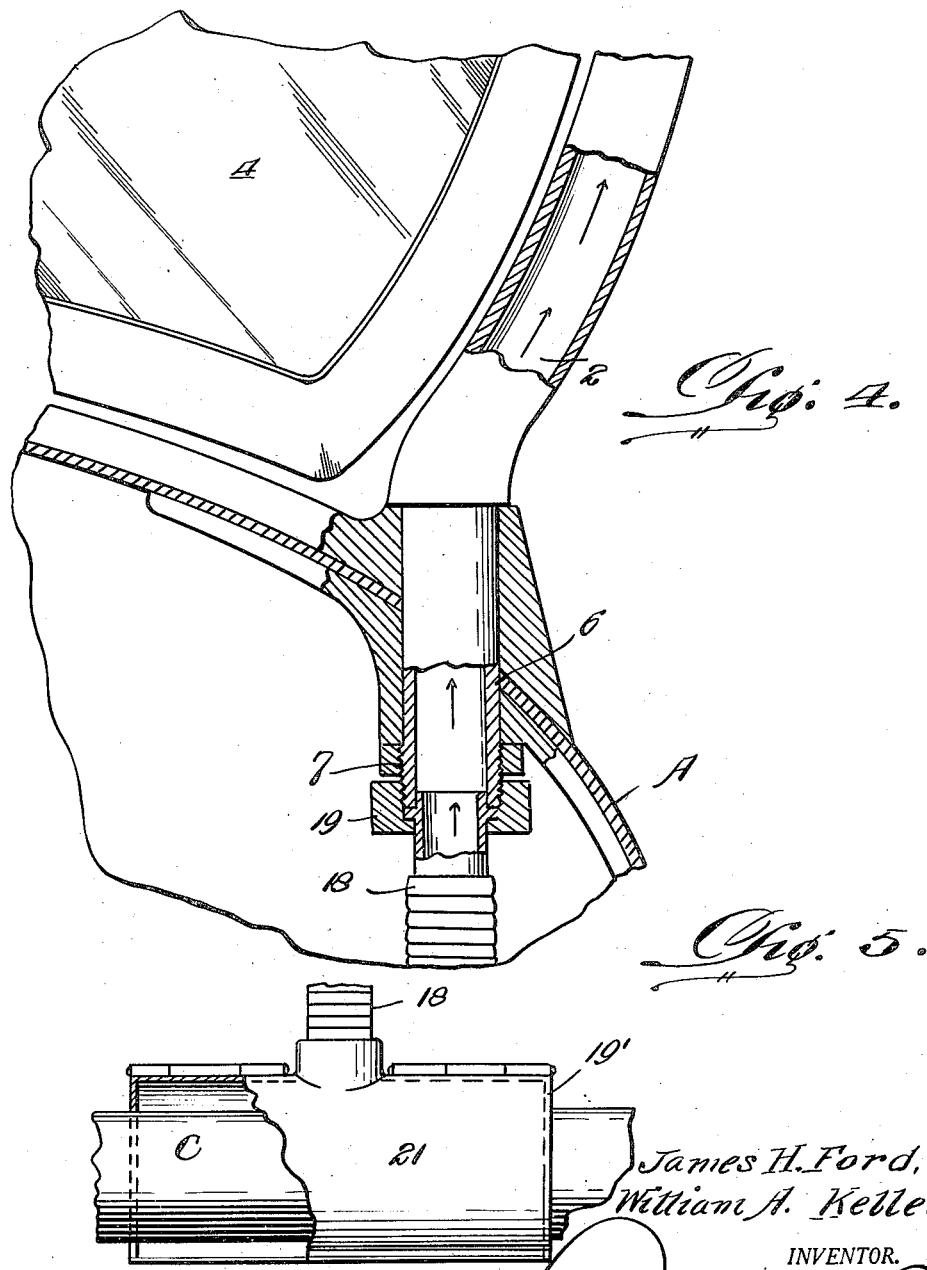

Patented Apr. 15, 1924.

1,490,168

UNITED STATES PATENT OFFICE.

JAMES H. FORD AND WILLIAM A. KELLER, OF PITTSBURGH, PENNSYLVANIA.

WINDSHIELD HEATER.

Application filed January 10, 1923. Serial No. 611,832.

*To all whom it may concern:*

Be it known that we, JAMES H. FORD and WILLIAM A. KELLER, citizens of the United States, residing at Pittsburgh, in the county of Allegheny and State of Pennsylvania, have invented certain new and useful Improvements in Windshield Heaters, of which the following is a specification.

Our invention relates to improvements in windshield heaters, primarily adapted for application to windshields of the motor vehicle type for preventing the accumulation of rain, snow or ice thereon, which accumulation mars the vision of the driver of the vehicle, preventing him from driving a machine properly in inclement weather.

A further object of the invention resides in the provision of such a device wherein the source of heat is obtained from the exhaust manifold of the internal combustion engine employed in driving the vehicle.

With these general objects in view and others that will appear as the nature of the invention is better understood, the same consists in the novel construction, combination, and arrangement of parts hereinafter more fully described, illustrated in the accompanying drawings, and pointed out in the appended claims.

In the drawings forming part of this application, like numerals of reference indicate similar parts in the several views, and wherein:—

Figure 2 is an enlarged fragmentary vertical cross sectional view of one side of the windshield.

Figure 3 is a transverse cross sectional view upon the line 3—3 of Figure 1.

Figure 4 is an enlarged fragmentary elevational and cross sectional view disclosing more clearly, the connecting means between the heat conveying pipe and one of the windshield supporting standards, and Figure 5 is a side elevational view of the heat receiving hood per se.

Figure 1:
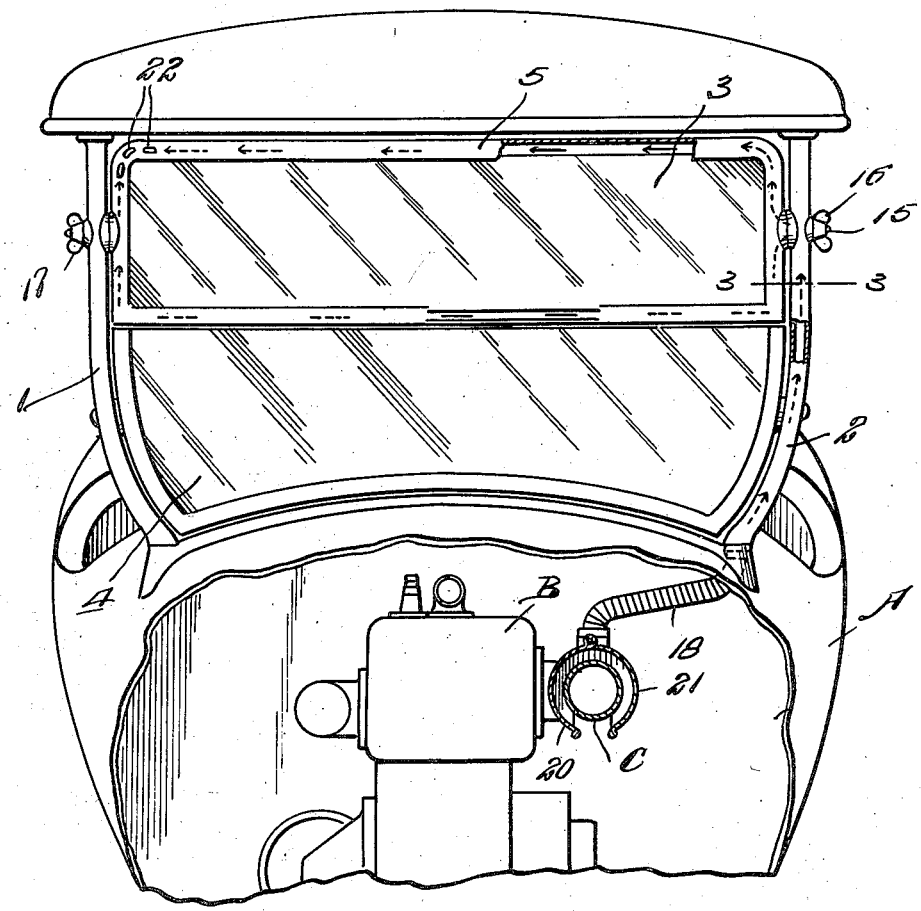
Figure 1 is a front elevational view of an automobile windshield, a portion of the automobile body being broken away for disclosing more clearly the hot air hood applied to the exhaust manifold of the automobile engine.

Referring to the drawings, there is shown an automobile adapted to be driven by a power plant B, which power plant includes the provision of the usual exhaust manifold C.

The automobile is provided with the usual vertical windshield standards 1 and 2 carrying an upper and lower pivotal windshield panel 3 and 4 respectively, therebetween. The lower windshield panel 4 is of usual construction, and the metallic frame 5 of the upper windshield panel is hollow as shown more clearly in Figures 2 and 3.

The windshield supporting standard 2 is also hollow, and is preferably square-shape in cross section, as clearly shown in Figure 3; the lower end of this standard 2 is rounded as at 6, and extends through an opening in the cowl portion of the automobile A, and is screw threaded as at 7. Adjacent the upper end of this standard, the same is provided with a relatively enlarged annular-shaped opening 8, upon the inner surface of the standard, and this opening is provided with a laterally extending annular flange portion 9, which is reduced at its outer end as at 10 for forming a shoulder 11 thereon. The upper panel frame 5 is also provided with an opening 12 adjacent the opening in the supporting standard 2, which opening is surrounded by a laterally extending flange 13, which flange engages over the reduced portion 10 of the standard flange 9 and abuts the shoulder 11 thereon.

Within the frame 5 and centrally of the opening 12 therein, is a collar or sleeve 14, supported by a spider 14', which collar or sleeve cooperates with a similar collar or sleeve in the standard 2 to receive the inner headed end of a transversely extending bolt 15. The opposite end of this bolt is screw threaded and engages through a suitable opening within the wall of the supporting standard 2, and is adapted for the reception of a wing nut 16 thereon. Between the opposite side of the upper panel 3 and the supporting standard 1, is a somewhat similar form of swivel connection 17, the standard 1 however, being of solid construction.

Communicating with the inlet end of the standard 2, is one end of a flexible pipe section 18, and being secured to the inlet end of the standard by any desired form of coupling 19. The opposite end of the flexible pipe section 18 has communication with a heat receiving hood 19'. This hood 19' is preferably in the form of a pair of hinged sections 20 and 21 adapted for detachable positioning upon the above mentioned exhaust manifold C of the engine B.

The frame 5 of the upper windshield panel 3 is provided with air outlet openings 22 in the upper left hand corner thereof, and in view of the above description, it will at once be apparent that the hot air passing upwardly from the exhaust manifold C through the flexible pipe 18 and hollow windshield supporting standard 2, will circulate around and through the frame 5 in the direction of the arrows shown in Figure 1, and outwardly through the openings 22. It will be obvious that the heated air will circulate through the frame 5 for constantly maintaining the upper panel warm.

While we have herein shown and described the preferred embodiment of the present invention, it is nevertheless to be understood that minor changes may be made therein, without departing from the spirit and scope of the invention as claimed.

What we claim as new is:—

1. In a device of the class described, a windshield panel including a hollow frame member, a pair of supporting standards pivotally supporting said panel therebetween, one of these standards being hollow, a heat conducting pipe communicating at one end with the hollow standard and having a heat receiving hood at its opposite end, and a hollow connection between the said windshield panel and the hollow supporting standard.

2. In a device of the class described, a windshield panel including a hollow frame member, a pair of supporting standards for the panel, one of the same being hollow, pivotal connections between the panel and supporting standards, one of these pivotal connections being so formed as to establish communication between the hollow frame and hollow standard, and a heat conveying pipe connected to the inlet end of said hollow standard and having a heat receiving hood at its lower end.

In testimony whereof we affix our signatures.

JAMES H. FORD.
WILLIAM A. KELLER.